US010637706B2

(12) United States Patent
Huang et al.

(10) Patent No.: US 10,637,706 B2
(45) Date of Patent: Apr. 28, 2020

(54) TRANSMISSION METHOD AND TRANSMISSION APPARATUS FOR PACKET FORMAT DETECTION

(71) Applicant: Panasonic Intellectual Property Management Co., Ltd., Osaka (JP)

(72) Inventors: Lei Huang, Singapore (SG); Michael Hong Cheng Sim, Singapore (SG); Yoshio Urabe, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 7 days.

(21) Appl. No.: 15/933,173

(22) Filed: Mar. 22, 2018

(65) Prior Publication Data

US 2018/0212811 A1    Jul. 26, 2018

Related U.S. Application Data

(63) Continuation of application No. PCT/JP2016/004300, filed on Sep. 21, 2016.

(30) Foreign Application Priority Data

Oct. 30, 2015  (JP) ................. 2015-214244

(51) Int. Cl.
H04L 27/26    (2006.01)
(52) U.S. Cl.
CPC ...... H04L 27/2647 (2013.01); H04L 27/2602 (2013.01); H04L 27/2613 (2013.01)
(58) Field of Classification Search
CPC ............. H04L 27/2613; H04L 27/2602; H04L 27/2647
See application file for complete search history.

(56) References Cited

U.S. PATENT DOCUMENTS

2010/0260159 A1* 10/2010 Zhang ................. H04L 27/2613
370/338
2015/0319700 A1* 11/2015 Oteri ..................... H04W 52/28
455/127.1
(Continued)

FOREIGN PATENT DOCUMENTS

GB           2417163 A  *  2/2006  ......... H04L 27/2608

OTHER PUBLICATIONS

International Search Report of PCT application No. PCT/JP2016/004300 dated Nov. 15, 2016.
(Continued)

Primary Examiner — Benjamin H Elliott, IV
(74) Attorney, Agent, or Firm — Seed IP Law Group LLP

(57) ABSTRACT

A transmission apparatus of the present disclosure comprises a packet generator which, in operation, generates a packet and a transmitter which, in operation, transmits the generated packet. The packet includes a legacy short training field, a legacy long training field, a legacy signal field (L-SIG), a repeated legacy signal field (RL-SIG), a first non-legacy signal field, a second non-legacy signal field, a non-legacy short training field, a non-legacy long training field and a data field, wherein the second non-legacy signal field is optionally present. The packet generator generates the packet by configuring the RL-SIG in different ways according to a presence or absence of the second non-legacy signal field in the packet.

6 Claims, 11 Drawing Sheets

(56) References Cited

U.S. PATENT DOCUMENTS

| | | | |
|---|---|---|---|
| 2016/0373961 A1* | 12/2016 | Li | H04W 74/004 |
| 2017/0085406 A1* | 3/2017 | Li | H04L 27/2608 |
| 2017/0230218 A1* | 8/2017 | Park | H04L 5/0048 |
| 2017/0310424 A1* | 10/2017 | Chun | H04L 1/16 |
| 2018/0006693 A1* | 1/2018 | Porat | H04L 5/0048 |
| 2018/0123757 A1* | 5/2018 | Ko | H04L 27/18 |
| 2018/0212811 A1* | 7/2018 | Huang | H04L 27/2602 |

OTHER PUBLICATIONS

IEEE 802.11-15/0132r9, "Specification Framework for TGax", Sep. 22, 2015.

IEEE 802.11-15/0579r4, "802.11ax Preamble Design and Auto-detection-r4", Sep. 12, 2015.

IEEE 802.11-15/0826r3, "HE-SIGA transmission for range extension", Sep. 15, 2015.

IEEE Std 802.11ac(TM)-2013, IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz, Dec. 11, 2013.

IEEE Std 802.11(TM)-2012, IEEE 8802-11, Information technology—Telecommunications and information exchange between systems—Local and metropolitan area networks—Specific requirements—Part 11: Wireless LAN medium access control (MAC) and physical layer (PHY) specifications, Nov. 1, 2012.

* cited by examiner

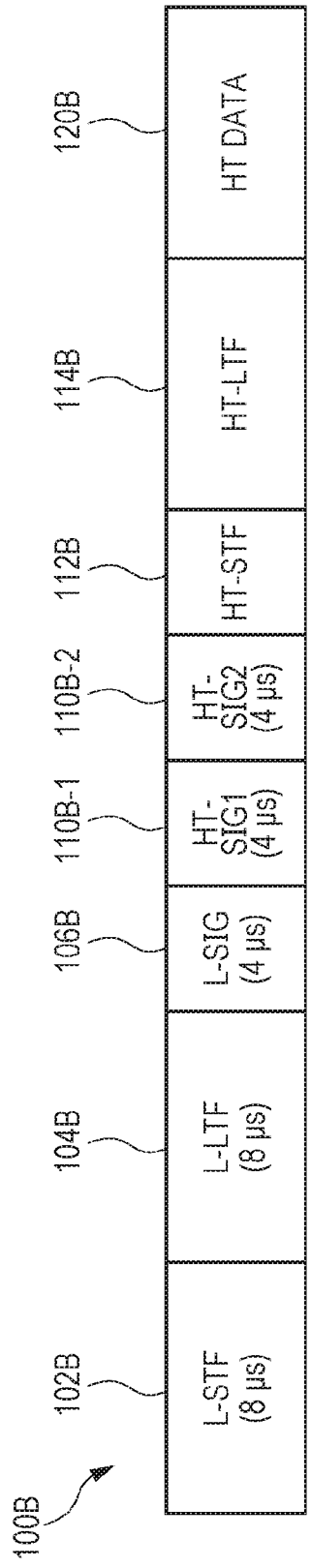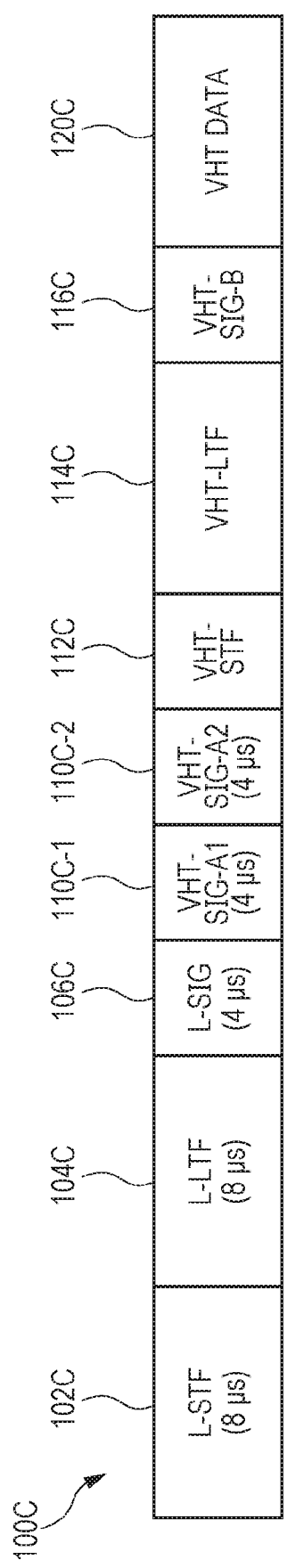

| L_Rate FIELD | DATA RATE (Mbps) | MODULATION | CODE RATE |
|---|---|---|---|
| 1101 | 6 | BPSK | 1/2 |
| 1111 | 9 | BPSK | 3/4 |
| 0101 | 12 | QPSK | 1/2 |
| 0111 | 18 | QPSK | 3/4 |
| 1001 | 24 | 16-QAM | 1/2 |
| 1011 | 36 | 16-QAM | 3/4 |
| 0001 | 48 | 64-QAM | 1/2 |
| 0011 | 54 | 64-QAM | 3/4 |

TRANSMISSION METHOD AND TRANSMISSION APPARATUS FOR PACKET FORMAT DETECTION

BACKGROUND

1. Technical Field

The present disclosure generally pertains to wireless communication systems and, more particularly, to detection of different formats of packets.

2. Description of the Related Art

The IEEE (Institute of Electrical and Electronics Engineers) 802.11 Working Group is developing 802.11ax HE (High Efficiency) WLAN (Wireless Local Area Network) air interface in order to achieve a very substantial increase in the real-world throughput achieved by users in high density scenarios while keeping backward compatibility with legacy 802.11a/g/n/ac standards. OFDMA (Orthogonal Frequency Division Multiple Access) multiuser transmission has been envisioned as one of the most important features in 802.11ax.

OFDM (Orthogonal Frequency Division Multiplexing) is a multiplexing technique that subdivides a system bandwidth into a plurality of orthogonal frequency subcarriers. In OFDM system, an input data stream is divided into several parallel substreams with a lower data rate (accordingly, increased symbol duration), and the substreams are modulated with respective orthogonal subcarriers and are transmitted. The increased symbol duration improves the robustness of OFDM system with respect to the channel delay spread. Further, introduction of a GI (Guard Interval) is able to completely remove intersymbol interference so far as the GI duration is longer than the channel delay spread. Further, OFDM modulation may be realized by an efficient IFFT (Inverse Fast Fourier Transform) that makes a plurality of subcarriers usable with little complexity. In OFDM system, time and frequency resources are defined by OFDM symbols in a time domain and subcarriers in a frequency domain. OFDMA is a multiple access scheme that performs multiple operations of data streams to and from the plurality of users over the time and frequency resources of the OFDM system. See, for example, IEEE 802.11-15/0132r9, Specification Framework for TGax, September 2015; IEEE 802.11-15/0579r4, 802.11ax Preamble Design and Auto-detection, September 2015; IEEE 802.11-150826r3, HE-SIGA transmission for range extension, September 2015; IEEE Std 802.11ac-2013; and IEEE Std 802.11-2012.

SUMMARY 802.11ax packets may co-exist with legacy 802.11a/g/n/ac packets in a 802.11 wireless network. Accordingly, what is desired is a transmission method and transmission apparatus that allows a receiver to receive and decode packets in an efficient fashion when the receiver can receive packets in different formats.

In one general aspect, the techniques disclosed here feature a transmission apparatus comprising a packet generator which, in operation generates a packet that includes a legacy short training field, a legacy long training field, a legacy signal field (L-SIG), a repeated legacy signal field (RL-SIG), a first non-legacy signal field, a second non-legacy signal field, a non-legacy short training field, a non-legacy long training field and a data field, wherein the second non-legacy signal field is optionally present in the packet, and the packet generator generates the packet by configuring the RL-SIG in different ways according to a presence or absence of the second non-legacy signal field in the packet and a transmitter which, in operation, transmits the generated packet.

With the transmission method and transmission apparatus of packet format detection of the present disclosure, it is possible for a receiver to receive and decode packets in an efficient fashion when the receiver can receive packets in different formats.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1B shows a diagram illustrating the format of an HT packet complying with the IEEE 802.11n stanard;

FIG. 1C shows a diagram illustrating the format of a VHT packet complying with the IEEE 802.11ac standard;

DETAILED DESCRIPTION

Various embodiments of the present disclosure will now be described in detail with reference to the annexed drawings. In the following description, a detailed description of known functions and configurations has been omitted for clarity and conciseness.

<Underlying Knowledge Forming Basis of the Present Disclosure>

Figure 1A:
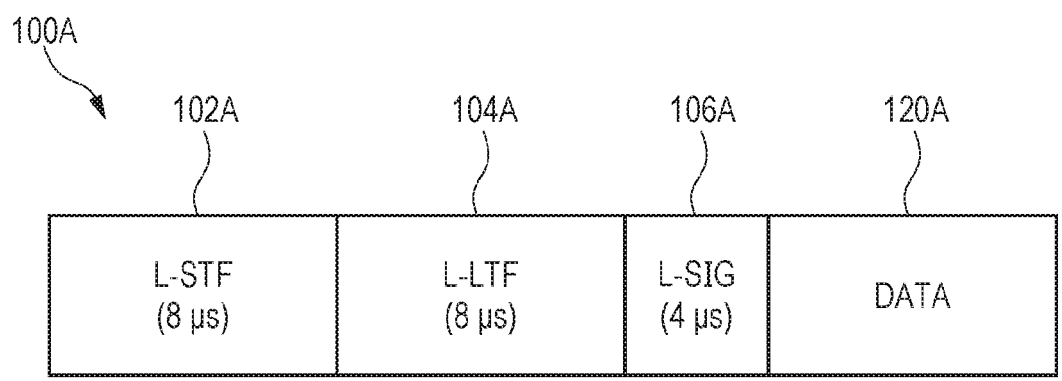
FIG. 1A shows a diagram illustrating the format of a packet complying with the IEEE 802.11a/g standard.

FIGS. 1A, 1B and 1C show various formats of legacy 802.11a/g/n/ac packets. FIG. 1A illustrates the format of a packet 100A complying with the IEEE 802.11a/g standard. FIG. 1B illustrates the format of a high throughput (HT) packet 100B complying with the IEEE 802.11n standard. FIG. 1C illustrates the format of a very high throughput (VHT) packet 100C complying with the IEEE 802.11ac standard.

With reference to FIG. 1A, the 802.11a/g packet 100A comprises a legacy preamble comprising a legacy short training field (L-STF) 102A, a legacy long training field (L-LTF) 104A and a legacy signal field (L-SIG) 106A, and a data field 120A. The L-STF 102A and L-LTF 104A are primarily used for packet detection, auto gain control (AGC) setting, frequency offset estimation, time synchronization and channel estimation. Both the L-STF 102A and the L-LTF 104A are 8 microseconds in length.

Figures 2A, 2B:
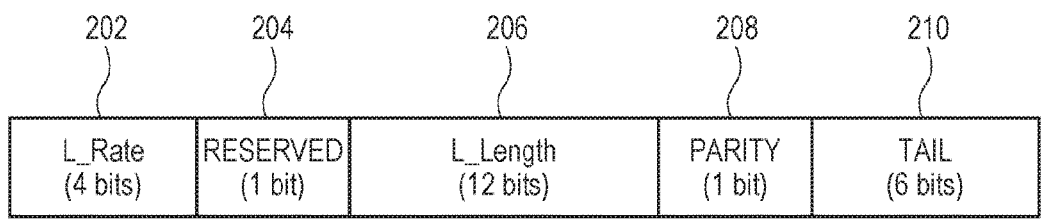
FIG. 2A shows a diagram illustrating the format of L-SIG in the 802.11a/g packet.
FIG. 2B shows a diagram illustrating the details of L_Rate field of L-SIG in the 802.11a/g packet.

FIG. 2A illustrates the format of L-SIG 106A in the 802.11a/g packet 100A of FIG. 1A. The L-SIG 106A comprises a 4-bit L_Rate field 202, a reserved bit 204, a 12-bit L_Length field 206, a parity bit 208 and 6 tail bits 210. The L_Rate field 202 conveys information about the modulation type and coding rate as used in the data field 120A. The details of the L_Rate field 202 is shown in FIG. 2B. The L_Length field 206 indicates amount of data in the data field 120A in octets. The parity bit 208 gives the even parity over the first 17 bits. Since the single parity bit 208 in the L-SIG 106A may be problematic in lower signal-to-noise ratio (SNR) conditions, the reserved bit 204 may be additionally used as extra parity in some implementations. The tail bits 210 are set to zero and used to flush the encoder and decoder, since the L-SIG 106A is separately encoded from the data field 120A. Note that not only is it important for the intended receiver of the packet 100A to correctly decode the L-SIG 106A, but also nearby stations need to correctly decode the L-SIG 106A in order to properly defer the channel access.

Figure 2C:
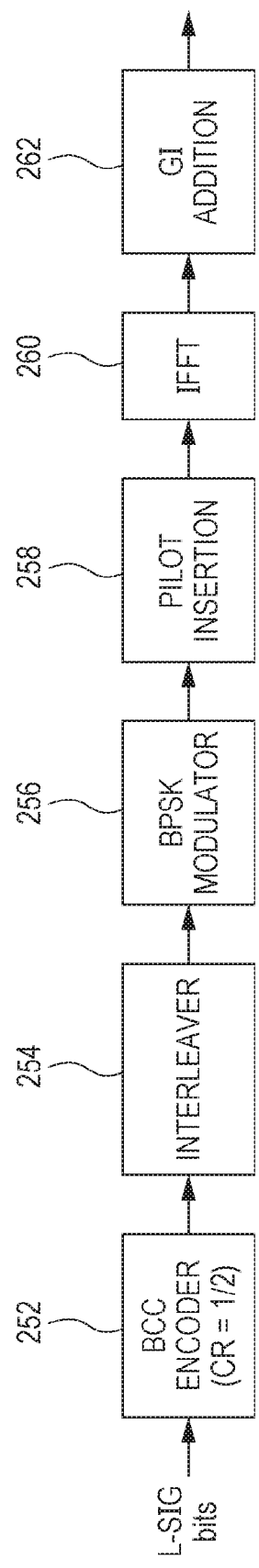
FIG. 2C shows a block diagram illustrating a transmitter for L-SIG in the 802.11a/g packet.

FIG. 2C is a block diagram illustrating a transmitter 250 for L-SIG 106A in the 802.11a/g packet 100A of FIG. 1A. The transmitter 250 comprises a binary convolutional code (BCC) encoder 252, an interleaver 254, a binary phase shift keying (BPSK) modulator 256, a pilot insertion block 258, an IFFT block 260 and a GI addition block 262. The BCC encoder 252 performs BCC encoding on the 24 information bits of the L-SIG 106A with a code rate of 1/2 and generates 48 encoded bits. The interleaver 254 performs interleaving operation on the 48 encoded bits according to a predefined interleaving rule. The BPSK modulator 256 converts the 48 encoded and interleaved bits into 48 BPSK information symbols where the input bit "0" is mapped to the symbol "−1" while the input bit "1" is mapped to the symbol "+1". And 48 BPSK information symbols are put in subcarriers −26 to 26 of an OFDM symbol except pilot subcarriers 21, −7, 7 and 21 as well as DC subcarrier 0 which is set to zero. The pilot insertion block 258 puts four pilot signals {+1,+1,+1,−1} in pilot subcarriers −21, −7, 7 and 21 of the OFDM symbol in order to make the coherent detection robust against frequency offsets and phase noise. The IFFT block 260 performs IFFT operation on 52 information and pilot symbols and generates an OFDM symbol which is 3.2 microsecond in length. The GI addition block 262 prepends a 0.8 microsecond cyclic prefix into the OFDM symbol, resulting that the SIG 106A is a 4 microsecond OFDM symbol.

Details of the transmission processing for the L-STF 102A, the L-LTF 104A and the data field 120A can be found in the IEEE 802.11a/g standard.

With reference to FIG. 1B, the HT packet 100B comprises a legacy preamble comprising an L-STF 102B, an L-LTF 104B and an L-SIG 106B, an HE preamble comprising a HT signal field (HT-SIG) 110B, an HT short training field (HT-STF) 112B and an HT long training field (HT-LTF) 114B, and an HT data field 120B.

The L-SIG 106B of the HT packet 100B is defined and transmitted in the similar manner as the L-SIG 106A of the 802.11a/g packet 100A as illustrated in FIG. 1A except that cyclic shifts are applied to the L-SIG 106B of the HT packet 100B in order to allow multiple spatial stream transmission through multiple antennas.

The HT-SIG 110B contains 48 information bits which are used to interpret the remaining HT packet 100B. The 48 HT-SIG bits are BCC encoded with rate 1/2 resulting in 96 bits. These are split into two symbols: HT-SIG1 110B-1 and HT-SIG2 110B-2. Each symbol is interleaved, BPSK mapped and has pilot subcarriers inserted. To facilitate packet format detection, the two symbols of HT-SIG 110B are modulated by BPSK with a 90-degree rotation (i.e., quadrature BPSK (QBPSK)). In other words, the input bit "0" is mapped to the symbol "−j" while the input bit "1" is mapped to the symbol "+j". Then IFFT operation is performed on each symbol to generate OFDM waveform which is 3.2 microsecond in length. A cyclic shift is applied and a 0.8 microsecond cyclic prefix is prepended into the OFDM waveform, resulting that each symbol of HE-SIG 110B is 4 microsecond in length.

The HT-STF 112B is used to reset AGC and reduces the dynamic range requirement on the analog-to-digital converter (ADC). The HT-LTF 114B is provided for MIMO (Multiple Input Multiple Output) channel estimation for receiving and equalizing the HT data field 120B.

Details of the transmission processing for the L-STF 102B, the L-LTF 104B, the HT-STF 112B, the HT-LTF 114B and the HT data field 120B can be found in the IEEE 802.11n standard.

With reference to FIG. 1C, the VHT packet 100C comprises a legacy preamble comprising an L-STF 102C, an L-LTF 104C and an L-SIG 106C, a VHT preamble comprising a first VHT signal field (VHT-SIG-A) 110C, a VHT short training field (VHT-STF) 112C, a VHT long training field (VHT-LTF) 114C and a second VHT signal field (VHT-SIG-B) 116C, and a VHT data field 120C.

The L-SIG 106C of the VHT packet 100C is defined and transmitted in the similar manner as the L-SIG 106B of the HT packet 100B as illustrated in FIG. 2B.

The VHT-SIG-A 110C contains 48 information bits which are used to interpret the remaining VHT packet 100C. The 48 VHT-SIG-A bits are BCC encoded with rate 1/2 resulting in 96 bits. These are split into two symbols (i.e., VHT-SIG-A1 110C-1 and VHT-SIG-A2 110C-2) and each symbol is interleaved. The VHT-SIG-A1 110C-1 is BPSK modulated and the VHT-SIG-A2 110C-2 is QBPSK modulated. Each symbol has pilot subcarriers inserted. Then IFFT operation is performed on each symbol to generate an OFDM waveform which is 3.2 microsecond in length. A cyclic shift is applied and a 0.8 microsecond cyclic prefix is prepended into the OFDM waveform, resulting that each of HE-SIG-A1 110C-1 and HE-SIG-A2 110C-2 is a 4 microsecond OFDM symbol.

The VHT-STF 112C is used to reset AGC and reduces the dynamic range requirement on the ADC. The VHT-LTF 114C is provided for MIMO channel estimation for receiving and equalizing the VHT data field 120C.

Details of transmission processing for the L-STF 102C, the L-LTF 104C, the VHT-STF 112C, the VHT-LTF 114C, the VHT-SIG-B 116C and the VHT data field 120C can be found in the IEEE 802.11ac standard.

It should be noted that resetting AGC is important for performance prior to the reception of the HT-LTF 114B or the VHT-LTF 114C. Significant gain changes can occur at the start of the HT-STF 112B or the VHT-STF 112C for several reasons. For example, cyclic shift changes (from 200 up to 600 microseconds on the transmitted spatial streams) can drastically change the effective wireless channel. Transmit beamforming can also result in 6 to 10 dB of received signal gain increase, and transmit antenna diversity schemes starting at the HT-STF 112B or the VHT-STF 112C and spatial expansion (according to the IEEE 802.11n or 802.11ac standard) can further modify the channel. These abrupt changes need to be compensated by the AGC to prevent effects such as ADC saturation (clipping).

According to the formats of the legacy 802.11a/g/n/ac packets shown in FIG. 1A to FIG. 1C, it is possible for a 802.11n/ac receiver to easily detect the format of an incoming packet. As shown in FIG. 1A, the BPSK modulated L-SIG arrives at the same time in the preamble for the 802.11a/g packet 100A, as it arrives in the preamble of the HT packet 100B in FIG. 1B and in the preamble of the VHT packet 100C in FIG. 1C. The next symbol that follows the L-SIG in a time domain will be the data field 120A for 802.11a/g, QBPSK modulated HT-SIG1 110B-1 for 802.11n, and BPSK modulated VHT-SIG-A1 110C-1 for 802.11ac. At this point, if the 802.11n receiver detects QBPSK modulated symbol immediately after the BPSK modulated L-SIG, the 802.11n receiver knows that the incoming packet has a 802.11n format. Otherwise, the 802.11n receiver determines that the incoming packet has a 802.11a/g format. At the same point, if the 802.11ac receiver detects QPSK (Quadrature Phase Shift Keying) modulated symbol or a modulated symbol with higher modulation scheme immediately after the BPSK modulated L-SIG, the 802.11ac receiver knows that the incoming packet has a 802.11a/g format. If the modulation of the symbol is QBPSK, the 802.11ac receiver knows that the incoming packet has a 802.11n format. However, if the modulation scheme of the symbol is BPSK, the incoming packet could have either a 802.11a/g format or a 802.11ac format, which means that the 802.11ac receiver cannot differentiate formats. By the next symbol (i.e., the second symbol following L-SIG in the time domain), the 802.11ac receiver can differentiate between 802.11a/g format and 802.11ac format since the modulation for VHT-SIG-A2 110C-2 is QBPSK.

As abovementioned, a 802.11n/ac receiver is able to determine that an incoming packet has a 802.11n format after reception of the first symbol following the L-SIG in the time domain. Since the time duration required by the 802.11n/ac receiver for detecting the packet format is approximately 1 symbol time (or about 4 microseconds), detection of an HT packet can be completed before the HT-STF 112B is received by the 802.11n/ac receiver. Thus, the 802.11n/ac receiver has enough time to reset the AGC properly. However, a 802.11ac receiver is only able to determine that an incoming packet has a 802.11ac format after reception of the second symbol following L-SIG in the time domain. This implies that detection of a VHT packet cannot be completed before the VHT-STF 112C is received by the 802.11ac receiver, resulting that the 802.11ac receiver may not have enough time to reset the AGC properly.

According to the IEEE 802.11n or 802.11ac standard, the HT packet 100B or the VHT packet 100C are designed in such a manner that a 802.11a/g device receiving the HT packet 100B or the VHT packet 100C will defer for the duration indicated by the L_Length and L_Rate fields in the L-SIG. The L_Rate field of the L-SIG in the HT packet 100B or the VHT packet 100C is set to indicate a rate of 6 megabits per second (Mbps). The L_Length field of the L-SIG in the HT packet 100B or the VHT packet 100C is set as follows:

$$L_{LENGTH} = \left\lceil \frac{TXTIME - 20}{4} \right\rceil \times 3 - 3 \qquad (1)$$

where TXTIME is transmit time of the HT packet 100B or the VHT packet 100C. In other words, the value of L_Length field of the L-SIG in the HT packet 100B or the VHT packet 100C is always a multiple of 3.

Figure 3:
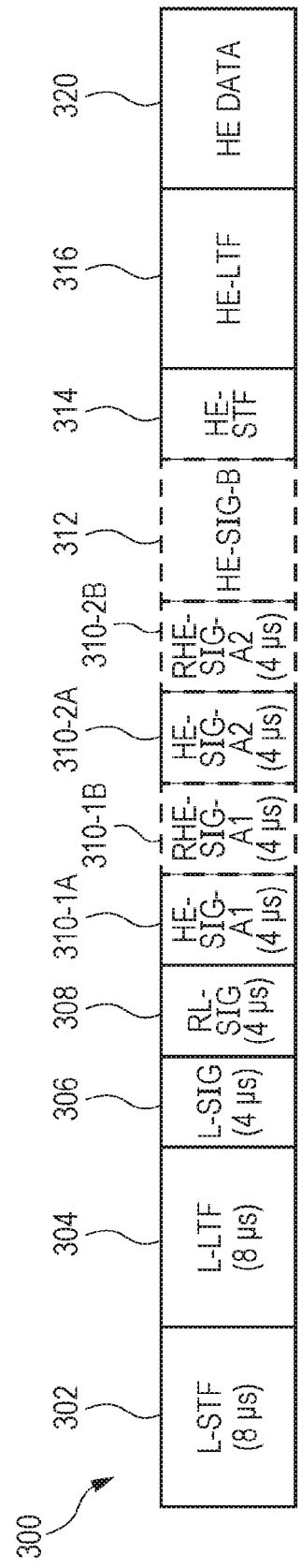
FIG. 3 shows a diagram illustrating the format of an HE packet complying with the IEEE 802.11ax specification framework document.

FIG. 3 illustrates the format of an HE packet 300 complying with the IEEE 802.11ax specification framework document. The HE packet 300 comprises a legacy preamble comprising an L-STF 302, an L-LTF 304 and an L-SIG 306, an HE preamble comprising a repeated L-SIG field (RL-SIG) 308, a first HE signal field (HE-SIG-A) 310, a second HE signal field (HE-SIG-B) 312, an HE short training field (HE-STF) 314 and an HE long training field (HE-LTF) 316, and an HE data field 320.

The L-SIG 306 in the HE packet 300 is defined and transmitted in the similar manner as the L-SIG 106A in the 802.11a/g packet 100A as illustrated in FIG. 2A, FIG. 2B and FIG. 2C except that cyclic shifts are applied to the L-SIG 306 in the HE packet 300 in order to allow multiple spatial stream transmission through multiple antennas.

The RL-SIG 308 is used to assist in detecting the format of the HE packet 300. According to a prior art, the RL-SIG 308 repeats the content of the L-SIG 306 and transmitted in the similar manner as the L-SIG 306, resulting that the RL-SIG 308 is also a 4 microsecond OFDM symbol.

The HE-SIG-A 310 carries common control information required to interpret the remaining HE packet 300, e.g., channel bandwidth, etc. The HE-SIG-A 310 has two different types. The HE-SIG-A 310 of the first type consists of two symbols, i.e., HE-SIG-A1 310-1A and HE-SIG-A2 310-2A. The HE-SIG-A 310 is transmitted in the similar manner as the VHT-SIG-A 110C. In more details, the HE-SIG-A bits are BCC encoded with rate 1/2. These are split into two symbols (i.e., HE-SIG-A1 310-1A and HE-SIG-A2 310-2A) and each symbol is interleaved and BPSK modulated. Each symbol has pilot subcarriers inserted. Then IFFT operation is performed on each symbol to generate an OFDM waveform which is 3.2 microsecond in length. A cyclic shift is applied and a 0.8 microsecond cyclic prefix is prepended into the OFDM waveform, resulting that each of HE-SIG-A1 310-1A and HE-SIG-A2 310-2A is a 4 microsecond OFDM symbol. On the other hand, the HE-SIG-A 310 of the second type consists of four symbols, i.e., HE-SIG-A1 310-1A, repeated HE-SIG-A1 (RHE-SIG-A1) 310-1B, HE-SIG-A2 310-2A and repeated HE-SIG-A2 (RHE-SIG-A2) 310-2B. The RHE-SIG-A1 310-1B repeats the content of HE-SIG-A1 310-1A and is generated in the same manner as the HE-SIG-A1 310-1A except that the interleaver is bypassed. Similarly, the RHE-SIG-A2 310-2B repeats the content of HE-SIG-A2 310-2A and is generated in the same manner as the HE-SIG-A2 310-2A except that the interleaver is bypassed. The HE-SIG-A 310 of the second type can be used to enhance robustness of transmission of HE-SIG-A 310 in outdoor scenarios. It should be noted that the HE-SIG-A1 310-1A right after the RL-SIG 308 is also BPSK modulated, and thus legacy 802.11a/g/n/ac devices will detect the HE packet 300 as a 802.11a/g packet.

The type of the HE-SIG-A 310 needs to be indicated before the HE-SIG-A 310 in order that the HE packet 300 can be processed by a 802.11ax receiver properly. In one embodiment, the L_Rate field of the L-SIG 306 and the RL-SIG 308 in the HE packet 300 is set to indicate a rate of 6 Mbps and the L_Length field of the L-SIG 306 and RL-SIG 308 in the HE packet 300 is set as follows:

$$L_{LENGTH} = \left\lceil \frac{TXTIME - 20}{4} \right\rceil \times 3 - 3 + m \qquad (2)$$

where m=1 or 2 is used for early indication of the type of the HE-SIG-A 310.

An alternative way for early indication of the type of the HE-SIG-A 310 is by means of two different scrambling sequences. In more details, prior to BCC encoding applied to information bits of the RL-SIG 308, for the HE-SIG-A 310 of the first type, a first scrambling sequence is scrambled with the information bits of the RL-SIG 308. Otherwise a second scrambling sequence is scrambled with the information bits of the RL-SIG 308. However, with reference to FIG. 4, repetition detection as a part of packet format detection has to be done after demodulation and decoding of the L-SIG 306 and RL-SIG 308 as well as blind descrambling of RL-SIG 308. As a result, time required for packet format detection increases significantly.

The HE-SIG-B 312 contains resource allocation information and per-user allocation information for designated receiving devices especially for downlink (DL) multiuser (MU) transmission. The HE-SIG-B 312 does not exist in the HE packet 300 if it intends to be used for single user (SU) transmission or for uplink (UL) MU transmission. For UL MU transmission, resource allocation information and per-user allocation information for designated transmitting devices are preset at access point and transmitted in a trigger frame by the access point to the designated transmitting devices.

The HE-STF 314 is used to reset AGC and reduces the dynamic range requirement on the ADC. If the HE packet 300 intends to be used for SU transmission or DL MU transmission, the HE-STF 314 is 4 microseconds in length. Otherwise it is 8 microseconds in length. The HE-LTF 316 is provided for MIMO channel estimation for receiving and equalizing the HE data field 320.

A signaling in the HE-SIG-A 310 may be used to indicate the presence of the HE-SIG-B 312 in the HE packet 300 (i.e., to indicate whether the HE packet 300 intends to be used for DL MU transmission). In this case, since two symbols of the HE-SIG-A 310 are jointly encoded, a 802.11ax receiver is only able to know the presence of the HE-SIG-B 312 after decoding the whole HE-SIG-A 310. This implies that detection of an HE packet 300 without the HE-SIG-B 312 (i.e., the HE-SIG-A 310 immediately followed by the HE-STF 314) cannot be completed before the HE-STF 314 is received by the 802.11ax receiver, resulting that the 802.11ax receiver may not have enough time to reset the AGC properly. Therefore, it is important to indicate the presence of the HE-SIG-B 312 in the HE packet 300 before the HE-SIG-A 310.

As mentioned above, if the HE packet 300 contains the HE-SIG-B 312, it intends to be used for DL MU transmission. Otherwise the HE packet 300 intends to be used for either SU transmission or UL MU transmission and a signaling in the HE-SIG-A 310 can be used to further indicate whether the HE packet 300 intends to be used for SU transmission or UL MU transmission.

Details of transmission processing for the L-STF 302, the L-LTF 304, the HE-SIG-B 312, the HE-STF 314, the HE-LTF 316 and the HE data field 320 can be found in the IEEE 802.11ax specification framework document.

Figure 4:
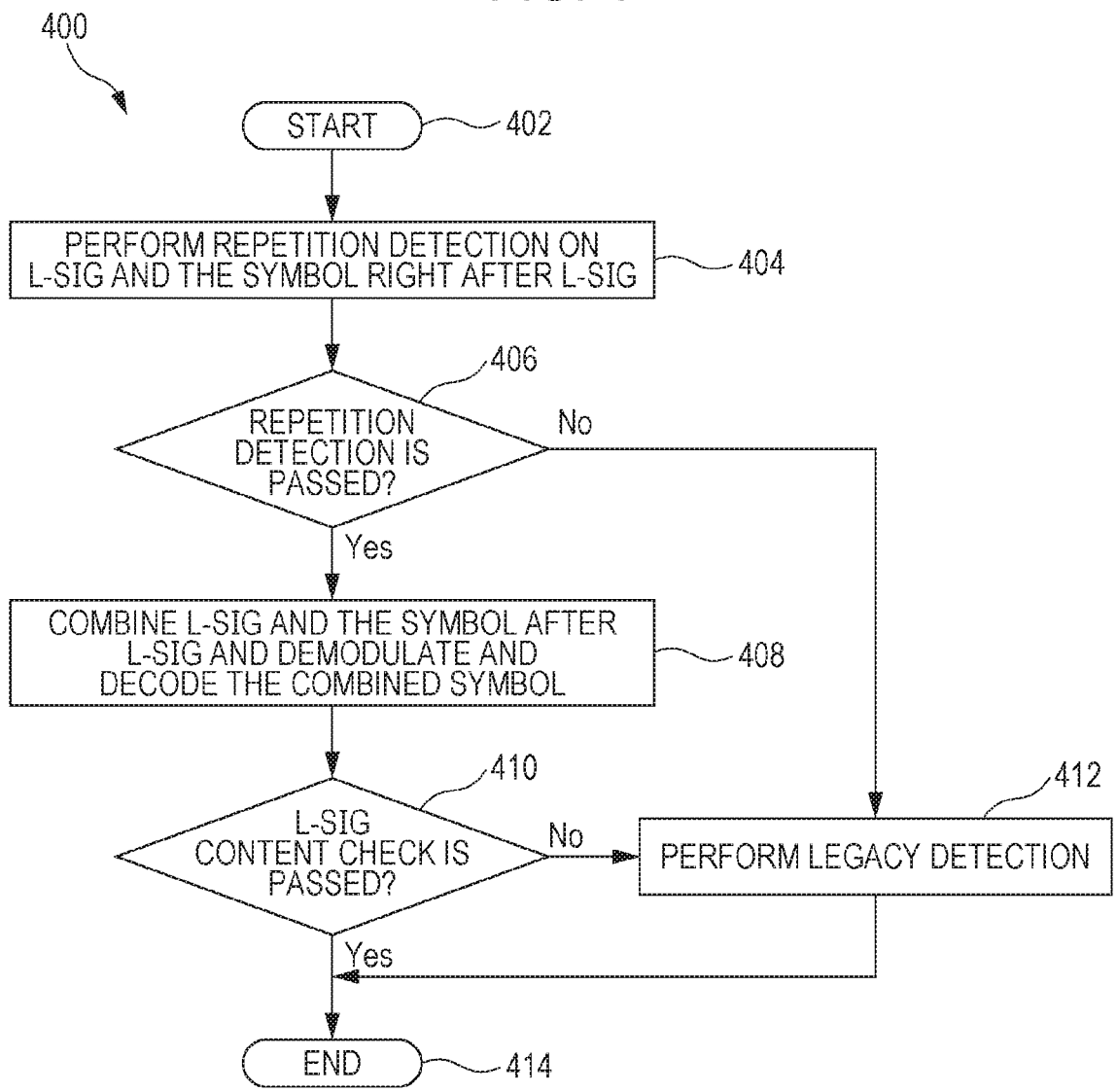
FIG. 4 shows a flow chart illustrating a method for detecting packet format according to a prior art.

FIG. 4 illustrates a method 400 for detecting packet format used in a wireless communication apparatus according to a prior art. The method 400 starts at step 402. At step 404, the wireless communication apparatus performs repetition detection to determine whether the symbol right after the L-SIG in an incoming packet has the same content as the L-SIG. In terms of repetition detection, it is preferable to perform correlation over data subcarriers between the L-SIG and the symbol right after the L-SIG after FFT (Fast Fourier Transform) processing. At step 406, if the correlation value is larger than a predefined threshold (i.e., repetition detection is passed), the method 400 goes to step 408. Otherwise the method 400 goes to step 412.

At step 408, the wireless communication apparatus performs maximal ratio combining (MRC) on the L-SIG and the symbol right after the L-SIG, followed by demodulating and decoding the combined L-SIG symbol. At step 410, the wireless communication apparatus checks the content of the decoded L-SIG. If all of the following conditions are satisfied:

The parity check is ok;
The value of the L_Rate field indicates a rate of 6 Mbps; and
The value of the L_Length field is a multiple of 3, L-SIG content check is passed and the wireless communication apparatus determines that the packet has a 802.11ax format and the method 400 stops at step 414. Otherwise the wireless communication apparatus performs the legacy 802.11a/g/n/ac packet detection at step 412.

Although the transmitter processing and content setting of the RL-SIG 308 in the HE packet 300 are instrumental in differentiating 802.11ax packet from legacy 802.11a/g/n/ac packets, they cannot help indicate the presence of the HE-SIG-B 312 in the HE packet 300.

Next, various embodiments for the transmitter processing and/or content setting of the RL-SIG 308 in the HE packet 300 and the corresponding method for packet format detection of the present disclosure will be explained in further details.

First Embodiment

According to a first embodiment of the present disclosure, the transmitter processing for the RL-SIG 308 in the HE packet 300 is changed to facilitate indication of the presence of the HE-SIG-B 312 in the HE packet 300. However, the transmitter processing for each of the L-STF 302, the L-LTF 304, the L-SIG 306, the HE-SIG-A 310, the HE-SIG-B 312, the HE-STF 314, the HE-LTF 316 and the HE data field 320 in the HE packet 300 remain unchanged.

Figure 5:
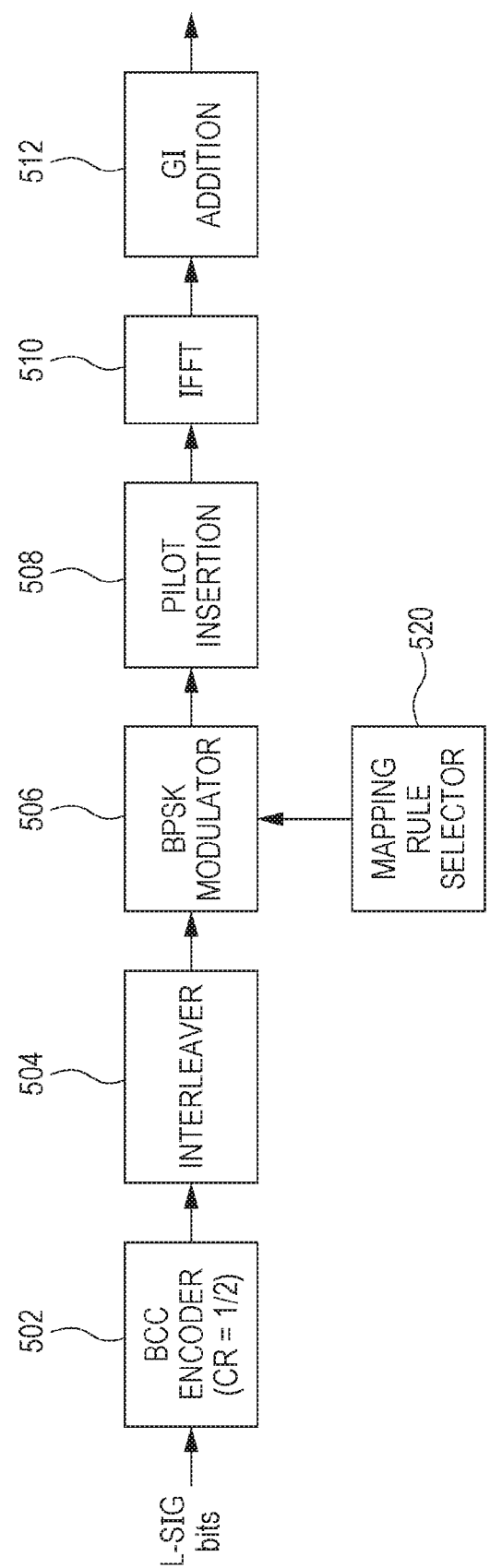
FIG. 5 shows a block diagram illustrating an example transmitter for RL-SIG in the HE packet according to a first embodiment of the present disclosure.

FIG. 5 is a block diagram illustrating a transmitter 500 for the RL-SIG 308 in the packet 300 of FIG. 3 according to the first embodiment of the present disclosure. The transmitter 500 comprises a BCC encoder 502, an interleaver 504, a BPSK modulator 506, a mapping rule selector 520, a pilot insertion block 508, an IFFT block 510 and a GI addition block 512. The BCC encoder 502, the interleaver 504, the pilot insertion block 508, the IFFT block 510 and the GI addition block 512 has the same function as their counterparts in the transmitter 200C as shown in FIG. 2C. Other than the BPSK modulator 256 in the transmitter 200C which employs a single modulation scheme, the modulation scheme used by the BPSK modulator 506 is configurable according to the presence of the HE-SIG-B 312 in the HE packet 300.

According to the first embodiment of the present disclosure, the BPSK modulator 506 supports two different modulation schemes (i.e., BPSK mapping rules). For example, the first BPSK mapping rule is the same as that is used by the BPSK modulator 256 in FIG. 2C. Namely, the input bit "0" is mapped to the symbol "−1" while the input bit "1" is mapped to the symbol "+1" in the IQ plane. On the other hand, according to the second BPSK mapping rule, the input bit "0" is mapped to the symbol "+1" while the input bit "1" is mapped to the symbol "−1" in the IQ plane. The BPSK mapping rule selector 520 selects which one of the first BPSK mapping rule and the second BPSK mapping rule is used by the BPSK modulator 506 according to the presence of the HE-SIG-B 312 in the HE packet 300. For example, in the HE packet 300 containing the HE-SIG-B 312, the first BPSK mapping rule is employed by the BPSK modulator 506. Otherwise, the second BPSK mapping rule is employed by the BPSK modulator 506.

Figure 6:
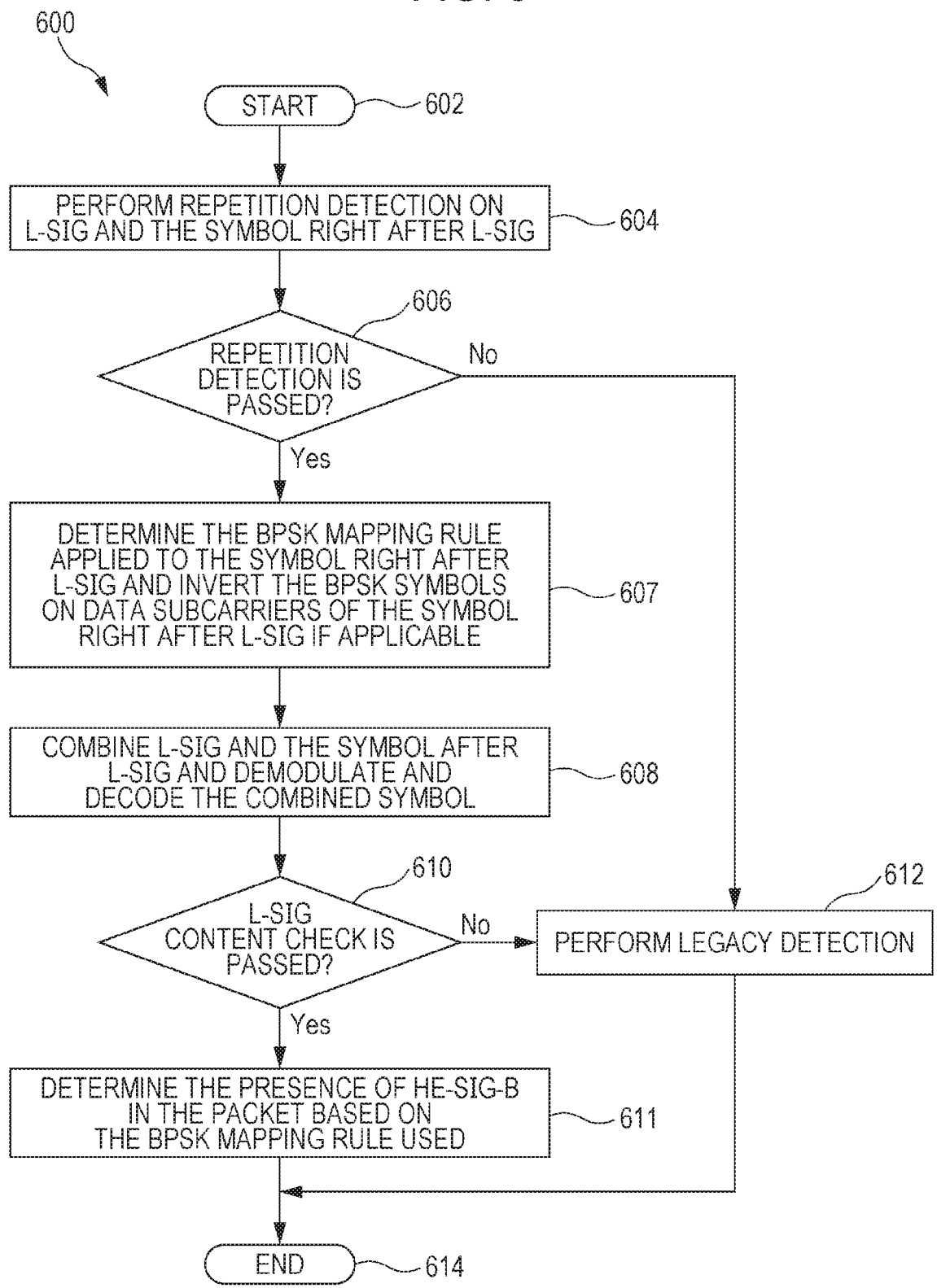
FIG. 6 shows a flow chart illustrating an example method for detecting packet format according to the first embodiment of the present disclosure.

FIG. 6 illustrates a method 600 for detecting packet format at a wireless communication apparatus according to the first embodiment of the present disclosure. The method 600 starts at step 602. At step 604, the wireless communication apparatus performs repetition detection to determine whether the symbol right after the L-SIG in an incoming packet has the same content as the L-SIG. In terms of repetition detection, it is preferable to perform correlation over data subcarriers between the L-SIG and the symbol right after the L-SIG after FFT processing. At step 606, if the absolute correlation value is larger than a predefined threshold (i.e., repetition detection is passed), the method 600 goes to step 607. Otherwise the method 600 goes to step 612.

At step 607, the wireless communication apparatus determines the BPSK mapping rule applied to the symbol right after the L-SIG, which can be done by checking the polarity of the correlation value used at step 606. For example, if the correlation value is positive, the first mapping rule is used. Otherwise the second mapping rule is used. In case that the second mapping rule is used, BPSK symbols on data subcarriers of the symbol right after the L-SIG shall be inverted. At step 608, the wireless communication apparatus performs MRC on the L-SIG and the symbol right after the L-SIG, followed by demodulating and decoding the combined L-SIG symbol. At step 610, the wireless communication apparatus checks the content of decoded L-SIG. If all of the following conditions are satisfied:

The parity check is ok;
The value of the L_Rate field indicates a rate of 6 Mbps; and
The value of the L_Length field is not a multiple of 3, L-SIG content check is passed and the wireless communication apparatus goes to step 611. Otherwise the wireless communication apparatus performs the legacy 802.11a/g/n/ac packet detection at step 612.

At step 611, the wireless communication apparatus determines that the packet has a 802.11ax format and determines the presence of the HE-SIG-B in the packet according to the BPSK mapping rule determined at step 607. For example, if the first mapping rule is used, there is the HE-SIG-B in the HE packet. Otherwise there is no HE-SIG-B in the HE packet. The method 600 stops at step 614.

With the first embodiment of the present disclosure, the abovementioned BPSK mapping rules based signaling can help not only differentiating 802.11ax packet from legacy 802.11a/g/n/ac packets, but also indicating the presence of the HE-SIG-B 312 in the HE packet 300.

Second Embodiment

According to a second embodiment of the present disclosure, the transmitter processing for the RL-SIG 308 in the HE packet 300 is changed to facilitate indication of the presence of the HE-SIG-B 312 in the HE packet 300. However, the transmitter processing for each of the L-STF 302, the L-LTF 304, the L-SIG 306, the HE-SIG-A 310, the HE-SIG-B 312, the HE-STF 314, the HE-LTF 316 and the HE data field 320 in the HE packet 300 remains unchanged.

Figure 7:
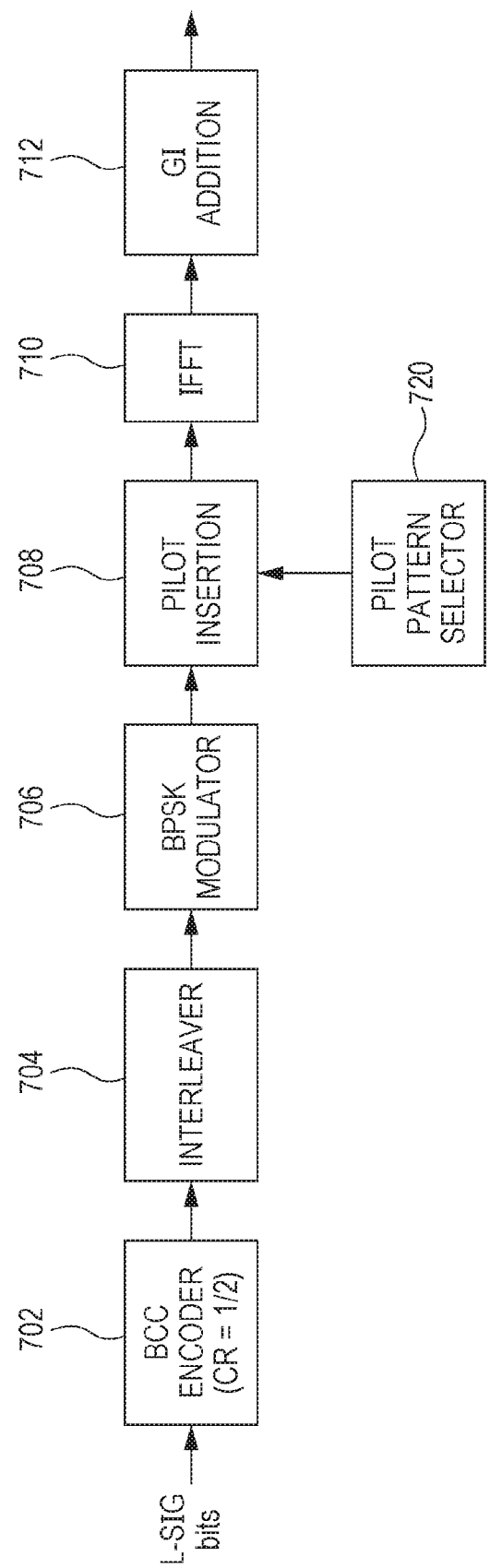
FIG. 7 shows a block diagram illustrating an example transmitter for RL-SIG in the HE packet according to a second embodiment of the present disclosure.

FIG. 7 is a block diagram illustrating a transmitter 700 for the RL-SIG 308 in the packet 300 according to the second embodiment of the present disclosure. The transmitter 700 comprises of a BCC encoder 702, an interleaver 704, a BPSK modulator 706, a pilot pattern selector 720, a pilot insertion block 708, an IFFT block 710 and a GI addition block 712. The BCC encoder 702, the interleaver 704, the BPSK modulator 706, the IFFT block 710 and the GI addition block 712 have the same function as their counterparts in the transmitter 200C as shown in FIG. 2C. Other than the pilot insertion block 258 in the transmitter 200C of FIG. 2C which employs a single pilot pattern, the pilot pattern used by the pilot insertion block 708 is configurable according to the presence of the HE-SIG-B 312 in the HE packet 300.

According to the second embodiment of the present disclosure, the pilot insertion block 508 supports two different pilot patterns. For example, the first pilot pattern is the same as that used by the pilot insertion block 258 while the second pilot pattern is the inverse of the first pilot pattern. Namely, the first pilot pattern is {+1, +1, +1, −1} while the second pilot pattern is {−1, −1, −1, +1}. These two pilot patterns are equivalent to an odd parity code and the Hamming distance between these two pilot patterns is four. The pilot pattern selector 720 selects which one of the first pilot pattern and the second pilot pattern is used by the pilot insertion block 708 according to the presence of the HE-SIG-B 312 in the HE packet 300. For example, in the HE packet 300 containing the HE-SIG-B 312, the first pilot pattern is used by the pilot insertion block 708. Otherwise, the second pilot pattern is used by the pilot insertion block 708.

Since the RL-SIG 308 is provided right after the L-SIG 306, the pilot signals included in the L-SIG 306 can be used for tracking frequency and phase offset for both the L-SIG 306 and the RL-SIG 308. So it is possible to make use of the pilot pattern applied to the RL-SIG 308 to indicate the presence of the HE-SIG-B 312 in the HE packet 300.

According to the second embodiment of the present disclosure, the pilot insertion block 508 may support four different pilot patterns. For example, the first pilot pattern is {+1,+1,+1,+1}, the second pilot pattern is {+1,−1,+1,−1}, the third pilot pattern is {+1,+1,−1,−1} and the fourth pilot pattern is {+1,−1,−1,+1}. These four pilot patterns are equivalent to an even parity code and the Hamming distance among these four pilot patterns are two. In one embodiment, the pilot pattern selector 720 selects which one of the these four pilot patterns is used by the pilot insertion block 708 according to the presence of the HE-SIG-B 312 in the HE packet 300. For example, in the HE packet 300 containing the HE-SIG-B 312, the first pilot pattern is used by the pilot insertion block 708. In the HE packet 300 not containing the HE-SIG-B 312, the second pilot pattern is used by the pilot insertion block 708. The third pilot pattern and the fourth pilot pattern are reserved for future extension. In another embodiment, the pilot pattern selector 720 selects which one of the these four pilot patterns is used by the pilot insertion block 708 according to the presence of the HE-SIG-B 312 in the HE packet 300 and the type of the HE-SIG-A 310 in the HE packet 300. For example, in the HE packet 300 with the HE-SIG-B 312 and the HE-SIG-A 310 of the first type, the first pilot pattern is used by the pilot insertion block 708. In the HE packet 300 without the HE-SIG-B 312 and with the HE-SIG-A 310 of the first type, the second pilot pattern is used by the pilot insertion block 708. In the HE packet 300 with the HE-SIG-B 312 and the HE-SIG-A 310 of the second type, the third pilot pattern is used by the pilot insertion block 708. In the HE packet 300 without the HE-SIG-B 312 and with the HE-SIG-A 310 of the second type, the fourth pilot pattern is used by the pilot insertion block 708.

According to the second embodiment of the present disclosure, the pilot insertion block 508 may support eight different pilot patterns. For example, the first pilot pattern is $\{+1,+1,+1,+1\}$, the second pilot pattern is $\{+1,-1,+1,-1\}$, the third pilot pattern is $\{+1,+1,-1,-1\}$, the fourth pilot pattern is $\{+1,-1,-1,+1\}$, the fifth pilot pattern is $\{-1,-1,-1,-1\}$, the sixth pilot pattern is $\{-1,+1,-1,+1\}$, the seventh pilot pattern is $\{-1,-1,+1,+1\}$ and the eighth pilot pattern is $\{-1,+1,+1,-1\}$. These eight pilot patterns are equivalent to an even parity code and the minimum Hamming distance among these eight pilot patterns is two. In one embodiment, the pilot pattern selector 720 selects which one of the these eight pilot patterns is used by the pilot insertion block 708 according to the presence of the HE-SIG-B 312 in the HE packet 300. For example, in the HE packet 300 containing the HE-SIG-B 312, the first pilot pattern is used by the pilot insertion block 708. In the HE packet 300 not containing the HE-SIG-B 312, the second pilot pattern is used by the pilot insertion block 708. The remaining six pilot patterns are reserved for future extension. In another embodiment, the pilot pattern selector 720 selects which one of the these eight pilot patterns is used by the pilot insertion block 708 according to the presence of the HE-SIG-B 312 in the HE packet 300 and the type of the HE-SIG-A 310 in the HE packet 300. For example, in the HE packet 300 with the HE-SIG-B 312 and the HE-SIG-A 310 of the first type, the first pilot pattern is used by the pilot insertion block 708. In the HE packet 300 without the HE-SIG-B 312 and with the HE-SIG-A 310 of the first type, the second pilot pattern is used by the pilot insertion block 708. In the HE packet 300 with the HE-SIG-B 312 and the HE-SIG-A 310 of the second type, the third pilot pattern is used by the pilot insertion block 708. In the HE packet 300 without the HE-SIG-B 312 and with the HE-SIG-A 310 of the second type, the fourth pilot pattern is used by the pilot insertion block 708. The remaining four pilot patterns are reserved for future extension.

Figure 8:
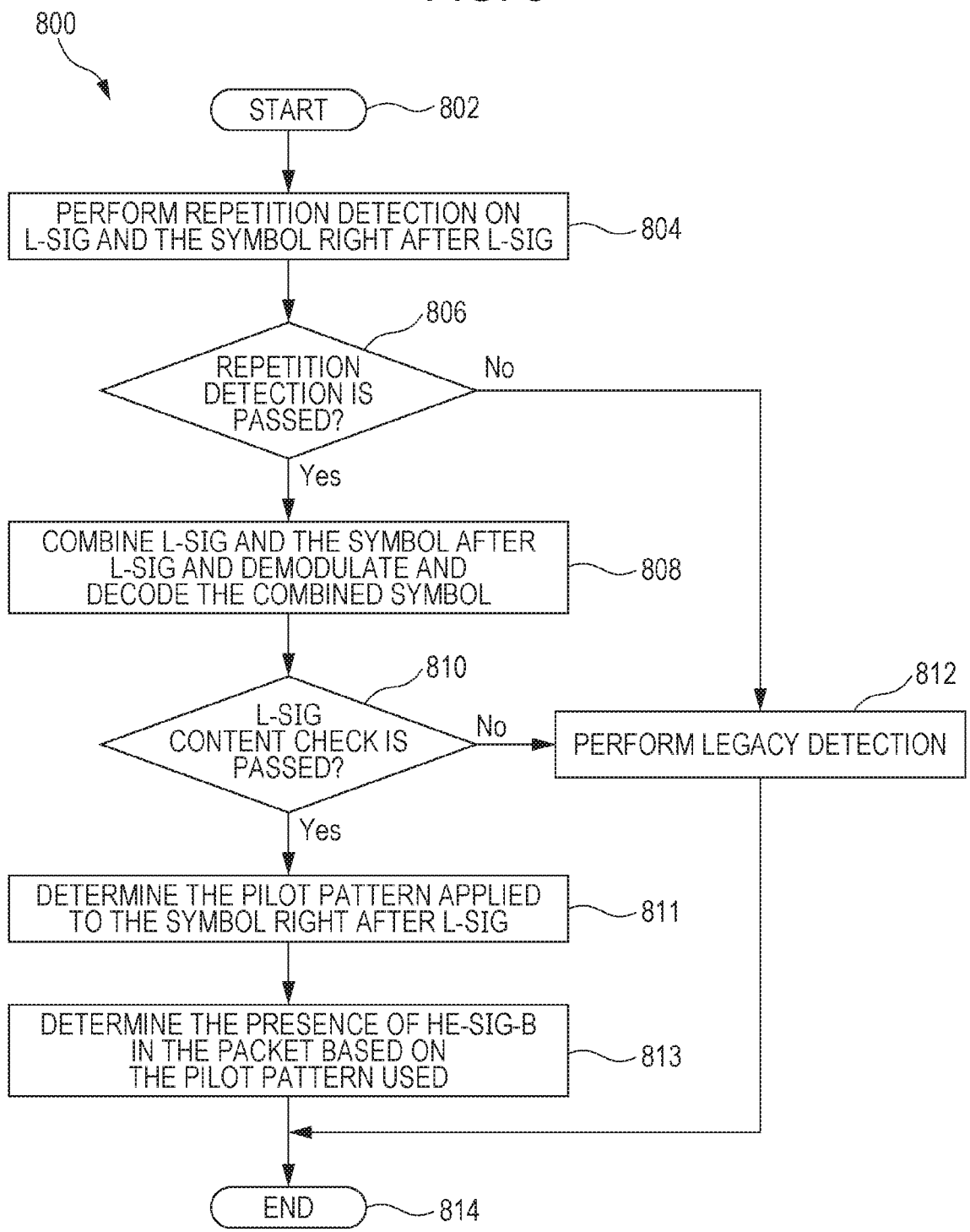
FIG. 8 shows a flow chart illustrating an example method for detecting packet format according to the second embodiment of the present disclosure.

FIG. 8 illustrates a method 800 for detecting packet format at a wireless communication apparatus according to the second embodiment of the present disclosure. The method 800 starts at step 802. At step 804, the wireless communication apparatus performs repetition detection to determine whether the symbol right after the L-SIG in an incoming packet has the same content as the L-SIG. In terms of repetition detection, it is preferable to perform correlation over data subcarriers between the L-SIG and the symbol right after the L-SIG after FFT processing. At step 806, if the correlation value is larger than a predefined threshold (i.e., repetition detection is passed), the method 800 goes to step 808. Otherwise the method 800 goes to step 812.

At step 808, the wireless communication apparatus performs MRC on the L-SIG and the symbol right after the L-SIG, followed by demodulating and decoding the combined L-SIG symbol. At step 810, the wireless communication apparatus checks the content of the decoded L-SIG. If all of the following conditions are satisfied:

The parity check is ok;
The value of the L_Rate field indicates a rate of 6 Mbps; and
The value of the L_Length field is not a multiple of 3, L-SIG content check is passed and the wireless communication apparatus goes to step 811. Otherwise the wireless communication apparatus performs the legacy 802.11a/g/n/ac packet detection at step 812.

At step 811, the wireless communication apparatus determines the pilot pattern applied to the symbol right after the L-SIG, which can be done by perform correlation between the pilot signals of the symbol right after the L-SIG and the predefined pilot patterns. The pilot pattern which achieves the maximal correlation value is determined. At step 813, the wireless communication apparatus determines that the packet has a 802.11ax format and determines the presence of the HE-SIG-B in the HE packet according to the pilot pattern determined at step 811. For example, if the first pilot pattern is used, there is the HE-SIG-B in the HE packet. Otherwise there is no HE-SIG-B in the HE packet. The method 800 stops at step 814.

With the second embodiment of the present disclosure, the abovementioned pilot patterns based signaling can help not only differentiating 802.11ax packet from legacy 802.11a/g/n/ac packets, but also indicating the presence of the HE-SIG-B 312 in the HE packet 300.

Third Embodiment

According to a third embodiment of the present disclosure, the content setting of the L-SIG 306 and RL-SIG 308 in the HE packet 300 is changed to facilitate indication of the presence of the HE-SIG-B 312 in the HE packet 300. However, the transmitter processing for each of the L-STF 302, the L-LTF 304, the L-SIG 306, the RL-SIG 308, the HE-SIG-A 310, the HE-SIG-B 312, the HE-STF 314, the HE-LTF 316 and the HE data field 320 in the HE packet 300 remains unchanged.

According to the third embodiment of the present disclosure, the L_Rate field of the L-SIG 306 and the RL-SIG 308 in the HE packet 300 is set to indicate a different rate according to the presence of the HE-SIG-B 312 in the HE packet 300. For example, in the HE packet 300 containing the HE-SIG-B 312, the L_Rate field of the L-SIG 306 and RL-SIG 308 is set to indicates a rate of 9 Mbps. Otherwise the L_Rate field of the L-SIG 306 and RL-SIG 308 is set to indicate a rate of 12 Mbps. The L_Length field of the L-SIG 306 and RL-SIG 308 is set as follows:

$$L_{LENGTH} = \left\lceil \frac{TXTIME - 20}{4} \right\rceil \times \frac{L_{RATE}}{2} - 3 \qquad (3)$$

where TXTIME is transmit time of the HE packet 300.

Figure 9:
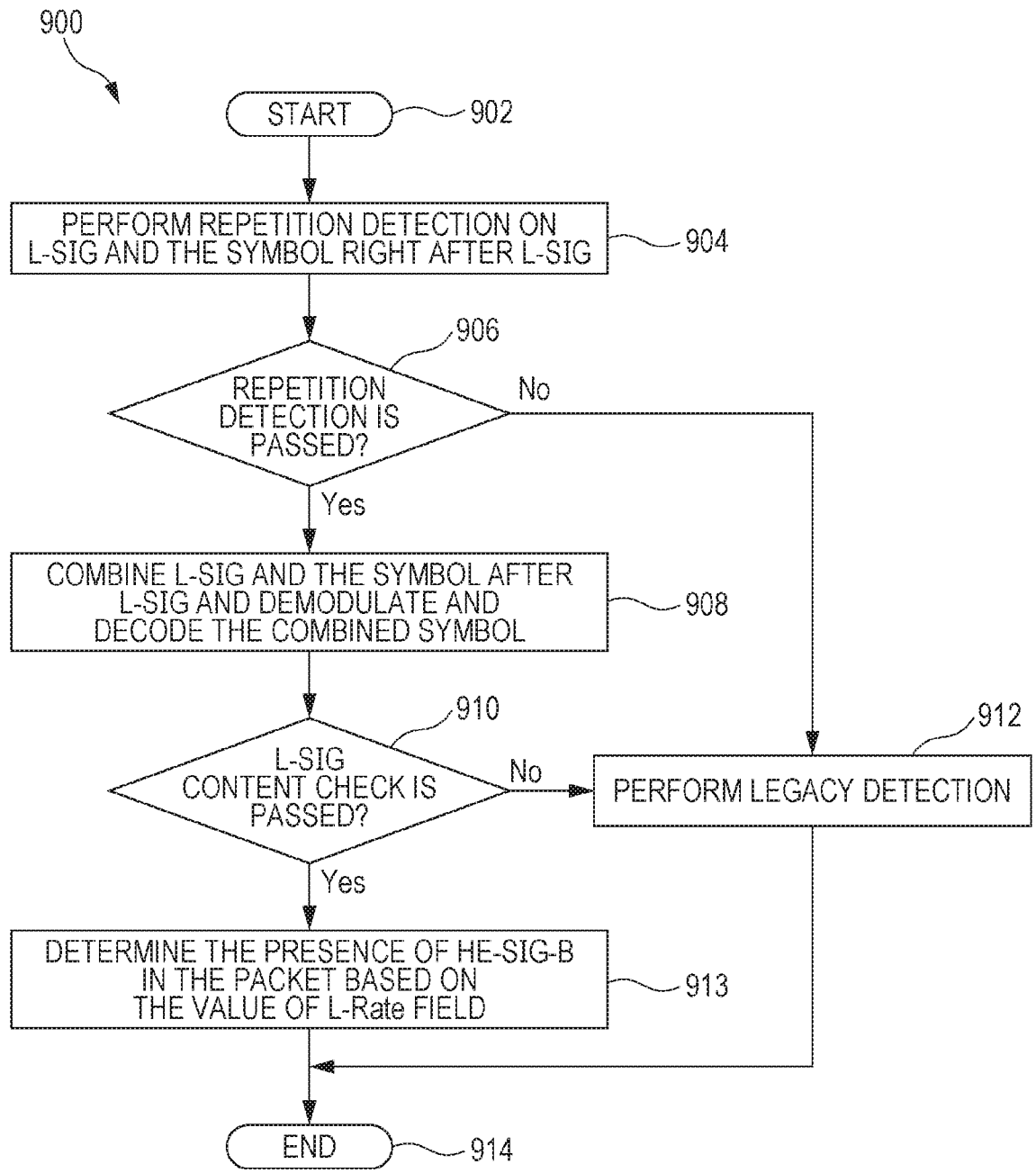
FIG. 9 shows a flow chart illustrating an example method for detecting packet format according to the third embodiment of the present disclosure.

FIG. 9 illustrates a method 900 for detecting packet format at a wireless communication apparatus according to the third embodiment of the present disclosure. The method 900 starts at step 902. At step 904, the wireless communication apparatus performs repetition detection to determine whether the symbol right after the L-SIG in an incoming packet has the same content as the L-SIG. In terms of repetition detection, it is preferable to perform correlation over data subcarriers between the L-SIG and the symbol right after the L-SIG after FFT processing. At step 906, if the correlation value is larger than a predefined threshold (i.e., repetition detection is passed), the method 900 goes to step 908. Otherwise the method 900 goes to step 912.

At step 908, the wireless communication apparatus performs MRC on the L-SIG and the symbol right after the L-SIG, followed by demodulating and decoding the combined L-SIG symbol. At step 910, the wireless communication apparatus checks the content of the decoded L-SIG. If the parity check is ok, L-SIG content check is passed and the wireless communication apparatus goes to step 913. Otherwise the wireless communication apparatus performs the legacy 802.11a/g/n/ac packet detection at step 912.

At step 913, the wireless communication apparatus determines that the packet has a 802.11ax format and determines the presence of the HE-SIG-B 312 in the HE packet 300 according to the value of the L_Rate used at step 910. For example, if the value of the L_Rate indicates a rate of 9 Mbps, there is the HE-SIG-B 312 in the HE packet 300. Otherwise there is no HE-SIG-B 312 in the HE packet 300. The method 900 stops at step 914.

With the third embodiment of the present disclosure, the abovementioned L_Rate based signaling can help not only differentiate 802.11ax packet from legacy 802.11a/g/n/ac packets, but also indicate the presence of the HE-SIG-B 312 in the HE packet 300. However, since the L_Rate field may be set to indicate a rate larger than 6 Mbps, the maximum transmission time of the HE packet 300 indicated by the L_Length field is compromised compared with the first and second embodiments of the present disclosure.

According to the present disclosure, each of the mapping rules based signaling according to the first embodiment, the pilot patterns based signaling according to the second embodiment and the L_Rate based signaling according to the third embodiment is not limited to be used for indicating the presence of the HE-SIG-B 312 in the HE packet 300, and can be used for other packet format indication. For one example, each of the mapping rules based signaling according to the first embodiment, the pilot patterns based signaling according to the second embodiment and the L_Rate based signaling according to the third embodiment can be used for indicating the type of the HE-SIG-A 310. For another example, each of the mapping rules based signaling according to the first embodiment, the pilot patterns based signaling according to the second embodiment and the L_Rate based signaling according to the third embodiment can be used for indicating packet formats in the future IEEE 802.11 standards which are required to keep backward compatibility with the IEEE 802.11a/g/n/ac/ax standards.

According to the present disclosure, the BPSK mapping rules based signaling according to the first embodiment and the pilot patterns based signaling according to the second embodiment can be combinatively used. For example, the BPSK mapping rules based signaling is used to indicate the presence of the HE-SIG-B 312 in the HE packet 300; while the pilot patterns based signaling is used to indicate the type of the HE-SIG-A 310 in the HE packet 300.

According to the present disclosure, the BPSK mapping rules based signaling according to the first embodiment and the L_Rate based signaling according to the third embodiment can be combinatively used. For example, the BPSK mapping rules based signaling is used to indicate the presence of the HE-SIG-B 312 in the HE packet 300; while the L_Rate based signaling is used to indicate the type of the HE-SIG-A 310 in the HE packet 300.

According to the present disclosure, the pilot patterns based signaling according to the second embodiment and the L_Rate based signaling according to the third embodiment can be combinatively used. For example, the pilot patterns based signaling is used to indicate the presence of the HE-SIG-B 312 in the HE packet 300; while the L_Rate based signaling is used to indicate the type of the HE-SIG-A 310 in the HE packet 300.

<Configuration of a Wireless Communication Apparatus>

Figure 10:
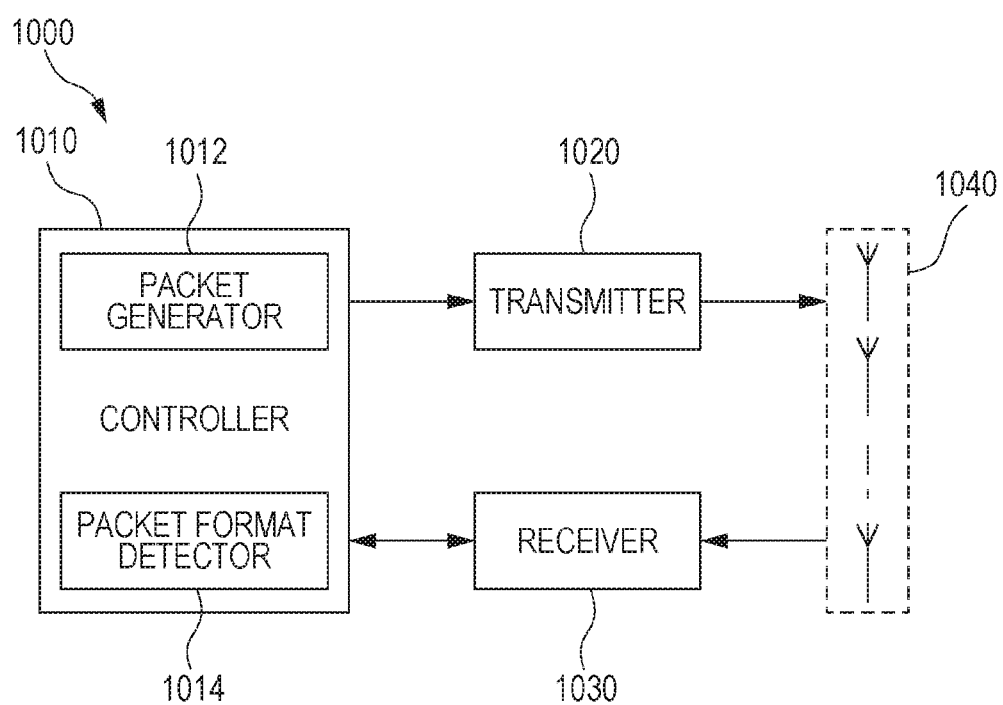
FIG. 10 shows a block diagram illustrating an example configuration of wireless communication apparatus according to the present disclosure.

FIG. 10 is a block diagram illustrating example architecture of a wireless communication apparatus 1000 according to the present disclosure. The wireless communication apparatus 1000 can be an access point in a centralized wireless network, a station in a centralized wireless network, or a node in a peer-to-peer wireless network. The wireless communication apparatus 1000 comprises a controller 1010, a transmitter 1020, a receiver 1030 and a plurality of antennas 1040. The controller 1010 comprises a packet generator 1012 and a packet format detector 1014. The packet generator 1012 is configured to create 802.11a/g/n/ac packets according to the IEEE 802.11a/g/n/ac standard or 802.11ax packets according to one of various embodiments of the present disclosure. The created 802.11a/g/n/ac packets are transmitted through the antenna 1040 after transmitter processing by the transmitter 1020 according to the IEEE 802.11a/g/n/ac standard. The created 802.11ax packets are transmitted through the antenna 1040 after transmitter processing by the transmitter 1020 according to the one of the various embodiments of the present disclosure. On the other hand, the controller 1010 is configured to analyze and process packets which are received through the antenna 1040 after receiver processing by the receiver 1030. In particular, the packet format detector 1014 inside the controller 1010 is configured to detect packet format according to the one of various embodiments of the present disclosure.

In the foregoing embodiments, the present disclosure is configured with hardware by way of example, but the disclosure may also be provided by software in cooperation with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

This disclosure can be applied to a method for performing packet format detection in a wireless communications system.

What is claimed is:

1. A transmission apparatus comprising:
a packet generator which, in operation, generates a packet that includes a legacy short training field, a legacy long training field, a legacy signal field (L-SIG), a repeated legacy signal field (RL-SIG), a first non-legacy signal field, a second non-legacy signal field, a non-legacy short training field, a non-legacy long training field and a data field, wherein the second non-legacy signal field is optionally present in the packet, and the packet generator generates the packet by configuring the RL-SIG by using different modulation schemes depending on a presence or absence of the second non-legacy signal field in the packet; and
a transmitter which, in operation, transmits the generated packet,
wherein a pilot pattern used for configuring the RL-SIG is different according to the presence or absence of the second non-legacy signal field in the packet.

2. The transmission apparatus, according to claim 1, wherein
a pilot pattern used for configuring the RL-SIG is different according to a type of the first non-legacy signal field and the presence or absence of the second non-legacy signal field.

3. The transmission apparatus, according to claim 1, wherein
a modulation scheme and a pilot pattern used for configuring the RL-SIG is different according to at least one of a type of the first non-legacy signal field and the presence or absence of the second non-legacy signal field in the packet.

4. A transmission method comprising:
generating a packet that includes a legacy short training field, a legacy long training field, a legacy signal field (L-SIG), a repeated legacy signal field (RL-SIG), a first non-legacy signal field, a second non-legacy signal field, a non-legacy short training field, a non-legacy long training field and a data field, wherein the second non-legacy signal field is optionally present in the packet and the packet is generated by configuring the RL-SIG by using different modulation schemes depending on a presence or absence of the second non-legacy signal field in the packet; and
transmitting the generated packet,
wherein a pilot pattern used for configuring the RL-SIG is different according to the presence or absence of the second non-legacy signal field in the packet.

5. The transmission method, according to claim 4, wherein
a pilot pattern used for configuring the RL-SIG is different according to a type of the first non-legacy signal field and the presence or absence of the second non-legacy signal field.

6. The transmission method, according to claim 4, wherein
a modulation scheme and a pilot pattern used for configuring the RL-SIG is different according to at least one of a type of the first non-legacy signal field and the presence or absence of the second non-legacy signal field in the packet.

* * * * *